Figure 1:
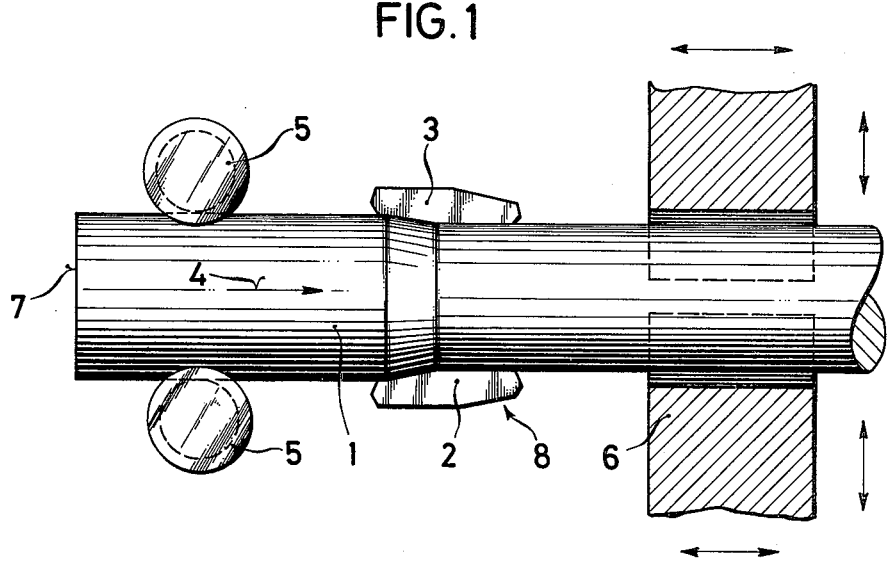

United States Patent [19]

Schweer

[11] 4,075,914

[45] Feb. 28, 1978

[54] METHOD FOR ROTARY PEELING ELONGATED WORKPIECES

[75] Inventor: Wilhelm Schweer, Leichlingen, Germany

[73] Assignee: Th. Kieserling & Albrecht, Solingen, Germany

[21] Appl. No.: 730,836

[22] Filed: Oct. 8, 1976

[30] Foreign Application Priority Data

Oct. 15, 1975 Germany .............................. 2546171

[51] Int. Cl.[2] .......................... B23B 1/00; B23B 5/00
[52] U.S. Cl. .......................................... 82/1 C; 82/20
[58] Field of Search ................... 82/1 R, 1 B, 1 C, 20

[56] References Cited

U.S. PATENT DOCUMENTS

| 3,350,965 | 11/1967 | Brauer et al. | 82/20 |
| 3,513,731 | 5/1970 | Michelson | 82/20 |

*Primary Examiner*—Harrison L. Hinson
*Attorney, Agent, or Firm*—Edward E. Sachs

[57] ABSTRACT

Elongated workpieces held against rotation at the entrance side of peeling tools are peeled at a substantially constant predetermined rate from the leading ends toward the trailing ends thereof until the trailing ends are adjacent the holding device. The remainder of the workpieces to the trailing ends thereof are then peeled at a slower rate than the predetermined rate.

5 Claims, 2 Drawing Figures

METHOD FOR ROTARY PEELING ELONGATED WORKPIECES

The invention relates generally to processing of elongated workpieces having generally circular cross-sectional shapes and, more particularly, to processing of such workpieces by performing finishing operations thereon which impart torsional stresses to the workpieces. The invention is particularly applicable for rotary peeling, descaling or the like and will be described with particular reference thereto. However, it will be appreciated that the method has broader aspects and may be used for other processing or finishing operations on elongated workpieces.

Finishing operations such as rotary peeling or the like on elongated workpieces are limited by the ability of the workpieces to withstand the torsional stresses imparted thereto by the finishing or peeling tools. This is particularly true for elongated workpieces having relatively small cross-sectional areas.

Workpieces undergoing finishing operations such as peeling or the like have two different cross-sectional sizes and surface characteristics. An unfinished or unpeeled area has a larger cross-sectional shape than the finished or peeled area of the workpiece. In view of the fact that the finished or peeled portion of the workpiece has a smaller cross-sectional size than the unfinished portion, the finished portion is capable of withstanding smaller torsional stresses than the unfinished portion of the workpiece which is better suited to withstand torsional stresses imparted thereto by the cutting or finishing forces. In addition, it is undesirable to place a high clamping or holding force on the finished surface of the workpiece for preventing rotation thereof because this results in a further limitation of the allowable stress which can be imparted to the workpiece. Due to these considerations, elongated workpieces having a generally circular cross-sectional shape, such as wire, rods and pipe, are generally held or clamped radially directly adjacent the entrance side of the finishing or peeling tools so that the clamping force is applied to the unfinished or unpeeled portion of the workpiece. However, clamping of the unfinished portion of the workpiece is not possible when the final trailing end portion of the workpiece is to be finished or peeled. This is because the trailing end portion of the workpiece must pass through the holding device at the entrance side of the finishing tools before that trailing end portion can pass through the finishing tools. Therefore, the workpiece must be clamped against rotation on its finished or peeled area at least during the finishing or peeling of the trailing end portion of the workpiece.

At the instant of transition when the workpiece is released from the holding device at the entrance side of the finishing tools and the holding device at the exit side of the finishing tools takes over, the trailing end portion of the workpiece twists between the finishing tools and the exit side holding device until the exit side holding device takes the full torsional stress imparted to the workpiece by the action of the finishing tools. In conventional devices, axial advance of the workpieces remains substantially constant from the leading ends to the trailing ends thereof. Due to the twisting of the trailing end portion of the workpiece when the holding device on the exit side of the finishing tools takes over, the relative rotational movement between the workpiece and the finishing tools is reduced momentarily. In view of the fact that the workpiece is continuing to advance axially, the finishing tools move axially without effecting any cutting of the workpiece so a greater bite is taken. Due to this increased bite of the peeling or finishing tools on the workpiece, a larger torsional stress is imparted to the workpiece which tends to break and this is particularly true when the workpiece was already stressed substantially to its breaking strength. In order to minimize this breakage, the stresses imparted to the workpieces have previously been planned in accordance with the strength of the finished cross section during the entire finishing operation. This substantially reduces the work output of a machine.

It is therefore the primary object of the present invention to provide an improved method of performing finishing operations on workpieces to substantially eliminate torsional breakage of the trailing end portions of the workpieces.

It is another object of the present invention to provide an improved method of performing finishing operations on elongated workpieces while holding the workpieces in an unfinished area adjacent the entrance side of the finishing tools by reducing the torsional stress imparted to the workpieces by the finishing tools before releasing the hold on the unfinished area of the workpieces for passage of the trailing end portions thereof through the finishing tools.

It is a further object of the present invention to provide an improved method of performing finishing operations such as peeling, scaling or the like of elongated workpieces by feeding the workpieces at a substantially constant predetermined velocity from the leading ends toward the trailing ends thereof until the trailing ends are adjacent a holding device at the entrance side of the finishing tools and then feeding the remainder of the workpieces through the finishing tools at a slower rate than the predetermined rate.

An aspect of the present invention relates to performing finishing operations such as peeling or the like on elongated workpieces at very high rates by imparting stresses to the workpieces up to the limit of the stress which can be taken by the unfinished cross section of the workpiece. This is accomplished by reducing the cutting force on the traline end portions of thw workpieces when the trailing ends of the workpieces reach the holding device at the entrance side of the finishing tools. An arrangement of this type makes it possible to fully utilize the load capacity of the unfinished workpiece over substantially the whole workpiece length without danger of having a torsion break occur in the trailing end portion. It is particularly important to increase the finishing or peeling speed of elongated workpieces having relatively small and medium diameters because a higher proportion of the cross-sectional area of such workpieces must be removed during the finishing or peeling operation. Therefore, such relatively small diameter workpieces are a particularly difficult problem with torsion breaks.

In a preferred arrangement, the torsional stress imparted to the workpieces by the finishing or peeling tools is reduced by lowering the velocity at which the workpieces are moved axially through the finishing tools just before the trailing end of the workpieces reach the holding device at the entrance end of the finishing tools. The axial velocity of the workpieces is a most easily varied component making up the cutting forces imparted to the workpieces. In addition, the axial velocity is not limited, either above or below, any particular speed, in accordane with known finishing or peeling technology. The rotary speed of the finishing tools, and particularly peeling cutters, have limits both as to effective machining and to materials. A maxium achievable cutting tool speed is frequently used in peeling operations or the like so that a temporary increase is not possible. In addition, peeling cutters and the like of the type commonly used are of extremely hard metal and have a certain minimum speed below which their cutting edges tend to chip.

For a better understanding of the present invention, together with other and further objects thereof, reference is had to the following description taken in connection with the accompanying drawings, and its scope will be pointed out in the appended claims.

Figure 2:
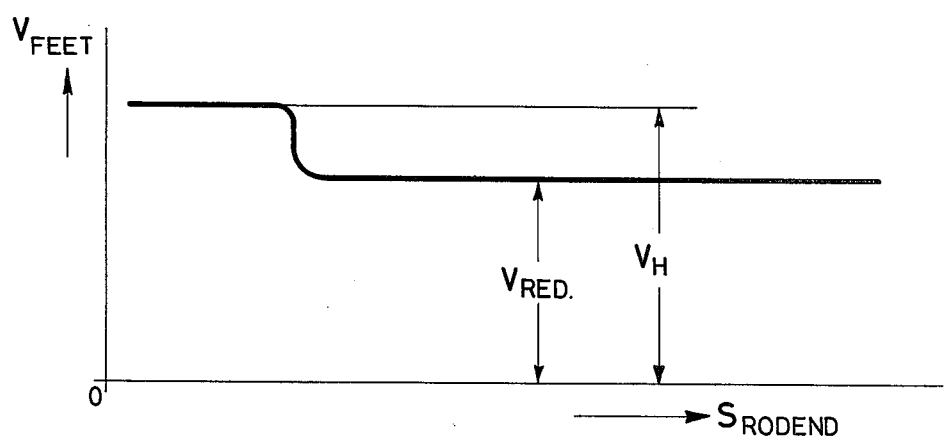

In the drawing:

FIG. 1 is a plan view showing an elongated workpiece undergoing a finishing operation; and FIG. 2 is a graph of the axial speed of the workpiece being processed in FIG. 1.

Referring now to the drawing, FIG. 1 shows a portion of an elongated metal workpiece 1 such as a wire, rod or pipe of generally circular cross-sectional shape. The workpiece 1 has a finishing or peeling operation performed thereon by the finishing tools 2 and 3 at a tool station 8. The workpiece is moved axially at a substantially constant predetermined velocity in the direction of arrow 4 from the leading end of the workpece toward the trailing end of the workpiece. A clamping or holding device 5 is provided at the entrance side of the tool station 8 for holding the rough unfinished area of the workpiece. Another clamping or holding device 6 is located at the exit side of the tool station 8 for clamping onto the finished area of the workpiece.

FIG. 2 generally shows the curve of the axial velocity of the workpiece 1 depending upon the distace of the rear end 7 thereof from the holding device 5. The axial velocity of the workpiece 1 is controlled so that it has a substantially constant predetermined velocity $V_H$. With a substantially constant velocity and a given rotary speed for the finishing or peeling tools 2 and 3, the unfinished portion of the workpiece is stressed by the finishing tools to a point just below the flow limit of the workpiece material. When the workpiece trailing end 7 is directly adjacent the holding device 5, the axial velocity of the workpiece 1 is smoothly slowed to a slower velocity in a manner which is free of any jerks or the like. The reduced axial velocity $v_{red}$ is arranged so that the cutting moment imparted to the workpieces can be taken by the workpiece in the area of the exit side holding device 6 without resulting in a torsion break of the workpiece. The cutting moment is a simple way of expressing the stress imparted to the workpiece by the cutting or finishing forces imparted thereto by the finishing tools. The cutting moment is determined essentially from the rotational speed of the finishing tools 2 and 3, and the axial velocity of the workpieces.

As previously mentioned, the point in time at which the cutting moment is taken over by the clamping device 6 at the exit side of the tool station 8 is particularly critical. Up until the time when the cutting moment is taken by the holding device 6, the workpiece between the tool station 8 and the holding device 6 is not stressed. Therefore, as soon as the trailing end 7 of the workpiece 1 leaves the holding device 5, the trailing end portion of the workpiece is twisted under the moment imparted thereto by the tools. This causes a reduction in the relative speed between the workpiece and the finishng tools so that a temporarily greater axial bite is taken by the finishing tools if the workpiece continues to move axially at the same velocity. This would result in a much higher cutting moment causing a torsion break in the workpiece if the finishing or peeling capacity is planned in accordance with the strength of the unfinished portion of the workpiece. By reducing the axial velocity of the workpiece before the cutting moment is taken by the holding device 6 the danger of a torsion break is substantially eliminated. This is due to the fact that when there is a reduction in the relative rotation between the workpiece and the finishing tools which might cause a greater axial bite of the tools on the workpiece, the axial velocity of the workpiece is slowed at the same time so the tools actually do not take a greater axial bite. Therefore, the cutting moment or torsional stress imparted to the workpiece by the finishing tools is not increased when the trailing end 7 passes through the holding device 5 and the torsional stress is taken over by the holding device 6. The holding device 6 may be applied to the workpiece during the entire finishing operation. However, the holding device 6 may also be applied just before the trailing end 7 passes through the holding device 5. In any event, the holding device 6 is applied to the workpiece for holding same against rotation at least as soon as the axial velocity of the workpiece is reduced.

With the improved method of the present invention, the workpieces are finished or peeled at a substantially constant rate from the leading ends toward the trailing ends thereof until the trailing ends are adjacent the holding device 5. The remainder of the workpieces to the trailing ends thereof are then finished or peeled at a slower rate than the constant rate in order that the torsional stress imparted to the workpiece remains essentially the same along the full length of the workpiece. That is, the moment imparted to the reduced finished cross section is smaller so that the stress in the finished smaller cross section is essentially the same as the stress imparted to the unfinished cross section by the greater moment. This is preferably accomplished by reducing the axial velocity of the workpiece as the trailing end thereof approaches the finishing tools and before the trailing end is released by the holding device at the entrance end of the cutting tools. The torsional stress imparted to the workpieces by the finishing tools is preferably reduced not later than release of the trailing end portion of the workpieces by the holding device 5. The finishing operation is continued to the trailing end thereof after reducing the torsional stress imparted to the workpieces by the finishing tools.

While there has been described what is a prevent considered to be the preferred procedures of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a method of processing elongated workpieces of generally circular cross-sectional shape including the steps of; progressively performing on the workpieces from leading to trailing ends thereof a finishing operation with finishing tools while preventing rotation of the workpieces under torsional stress imparted thereto from the finishing operation by holding the workpieces in an unfinished area adjacent the finishing tools, releasing the hold on the unfinished area of the workpieces as the trailing ends thereof approach the finishing tools, and clamping the workpieces in a finished area adjacent the finishing tools at least prior to said step of releasing the hold on the unfinished area, the improvement comprising; smoothly reducing the torsional stress imparted to the workpieces by the finishing tools before said step of releasing the hold on the unfinished area of the workpieces and continuing to perform the finishing operation on the workpieces to the trailing ends thereof at the reduced torsional stress.

2. The method of claim 1 wherein the workpieces are moved axially at a predetermined velocity past the finishing tools and said step of reducing the torsional stress is carried out by smoothly slowing the axial movement of the workpieces to substantially less than said predetermined velocity.

3. The method of claim 1 wherein the reduction in torsional stress imparted to the workpiece is such that the torsional stress imparted to the unfinished workpiece held against rotation adjacent the entrance side of the peeling tools is substantially the same as the torsional stress imparted to the finished workpiece held against rotation adjacent the exit side of the peeling tools.

4. A method of rotary peeling elongated workpieces while holding the workpieces against rotation in an unpeeled area adjacent the entrance side of the peeling tools comprising the steps of; peeling the workpieces at a substantially constant predetermined rate from the leading ends toward the trailing ends thereof until the trailing ends are adjacent the holding device by moving the workpieces axially past the peeling tools at a substantially constant velocity, peeling the remainder of the workpieces to the trailing ends thereof at a substantially slower rate than said predetermined rate by smoothly slowing the axial velocity of the workpieces to a substantially slower velocity than said constant velocity, and holding the workpieces against rotation in a peeled area adjacent the exit side of the peeling tools not later than said step of peeling the remainder of the workpieces at a substantially slower rate.

5. The method of claim 4 wherein the steps of peeling at the predetermined and slower rates are carried out so that the torsional stress imparted to the unfinished workpiece held against rotation adjacent the entrance side of the peeling tools is substantially the same as the torsional stress imparted to the finished workpieces held against rotation adjacent the exit side of the peeling tools.

* * * * *